United States Patent [19]

Baney et al.

[11] Patent Number: 5,268,738
[45] Date of Patent: Dec. 7, 1993

[54] EXTENDED DISTANCE RANGE OPTICAL LOW-COHERENCE REFLECTOMETER

[75] Inventors: Douglas M. Baney, Los Altos; Wayne V. Sorin, Mountain View, both of Calif.

[73] Assignee: Hewlett-Packard Company, Palo Alto, Calif.

[21] Appl. No.: 907,765

[22] Filed: Jun. 30, 1992

[51] Int. Cl.$^5$ .............................................. G41B 9/02
[52] U.S. Cl. ...................... 356/345; 356/349; 356/352; 250/227.19
[58] Field of Search ............. 356/345, 349, 352, 73.1, 356/350; 385/12; 250/227.19, 227.27

[56] References Cited

U.S. PATENT DOCUMENTS 5,231,611  7/1993  Laznicka, Jr. ...................... 356/345

OTHER PUBLICATIONS

"Optical Coherence-Domain Reflectometry: A New Optical Evaluation Technique", Robert C. Youngquist, Sally Carr, and D. E. N. Davies, *Optics Letters*, vol. 12, No. 3, Mar. 1987.

"New Measurement System for Fault Location in Optical Waveguide Devices Based on an Interferometric Technique", Kazumasa Takada, Itaru Yokohama, Kazumori Chida, and Juichi Noda, *Applied Optics*, vol. 26, No. 9, May 1, 1987.

"Guided-Wave Refelectometry With Micrometer Resolution", B. L. Danielson and C. D. Whittenberg, *Applied Optics*, vol. 26, No. 14, Jul. 15, 1987.

*Primary Examiner*—Samuel A. Turner
*Assistant Examiner*—Robert Kim

[57] ABSTRACT

An improved optical low-coherence reflectometer is disclosed for use in measuring the strength and location of optical reflections. The invention utilizes a reference signal comprising multiple copies of a light signal to increase the range of distance measurements over which the reflectometer operates. Each copy of the light signal is delayed by a different amount. Embodiments in which the copies are generated with a ring resonator, a Fabry-Perot cavity, and multiple fiber delay lines are described.

8 Claims, 6 Drawing Sheets

EXTENDED DISTANCE RANGE OPTICAL LOW-COHERENCE REFLECTOMETER

FIELD OF THE INVENTION

The present invention relates to optical measurements, and more particularly, to optical reflectometry.

BACKGROUND OF THE INVENTION

The increased use of optical components in communication and data processing systems has created an increased need for a method for measuring optical inhomogeneities in optical components. For example, in fiber optic based communication systems there is a need to measure splice losses and the location of non-reflecting fiber breaks. Similarly, there is a need for a methodology for characterizing optical components such as silica based optical planar wave guides and $LiNbO_3$ wave guides.

One method for analyzing inhomogeneities in optical fibers is optical time domain reflectometry. In this method, a light pulse is transmitted down the optical fiber and the backscattered light resulting from the interaction of the light pulse with an inhomogeneity in the fiber is measured. The time delay between the incident light pulse and reflected light provides information on the location of the inhomogeneity. The amplitude of the backscatter light signal provides information on the degree of inhomogeneity. In conventional pulsed techniques, the measurement of the backscattered light becomes more difficult as spatial resolution is improved. Higher spatial resolution simultaneously results in lower levels of Rayleigh backscattered light power and increased noise power due to larger receiver bandwidths.

White light interferometry or optical low-coherence reflectometry provides a technique that allows several orders of magnitude improvement in both sensitivity and spatial resolution compared to conventional time domain methods. Spatial resolutions of 20 to 40 microns have been reported using this technique. This resolution is equivalent to the resolution that would be obtained using pulse widths of a few hundred femtoseconds using conventional pulse techniques. For these resolutions, the average Rayleigh backscattered levels for standard telecommunications fibers are of the order of −115 dB. Reflection sensitivities have been limited to values close to the backscattered levels due to the noise intensity of low-coherence optical sources. However, a reflection sensitivity of −136 dB has been demonstrated at a wavelength of 1.3 microns using a high-power superluminescent diode and a balanced detection scheme to eliminate the effects of intensity noise [Takada, et al., "Rayleigh Backscattering Measurements of Single-Mode Fibers by Low Coherence Optical Time-Domain Reflectometry With 14 mm Spatial Resolution", *Appl. Phys. Lett.*, 59, p.143, 1991].

While optical low-coherence reflectometry provides the resolution and sensitivity to perform the measurements in question, the distances over which optical low-coherence reflectometers can scan is limited to about 0.5 meters. This limitation is due to the limited range over which a mirror can be moved using a leadscrew. Hence, inhomogeneities that are separated by more than 0.5 meters cannot be simultaneously detected. There is a need to dramatically increase the scan range because many optical devices that are to be probed have fiber lead lengths greater than one meter. To scan for inhomogeneities separated by larger distances, multiple measurements in the 0.5 meter range must be made with the aid of fixed optical delay lines. This procedure is time consuming.

Broadly, it is an object of the present invention to provide an improved optical low-coherence reflectometry measurement apparatus and method.

It is a further object of the present invention to provide an optical low-coherence reflectometry system that can scan for inhomogeneities separated by many meters.

These and other objects of the present invention will become apparent to those skilled in the art from the following detailed description of the invention and the accompanying drawings.

SUMMARY OF THE INVENTION

The present invention comprises an optical interferometer for measuring the optical properties of a device. The device is illuminated by a an optical low-coherence source. Light from the source is split into first and second light signals by a coupler. The first light signal is applied to the device and a portion of the light reflected therefrom is collected. A series of light signals is generated from said second light signal, each said generated light signal being displaced in time with respect to the original light signal in the sequence. The generated sequence of light signals is then combined with the light collected from the device and the amplitude of the combined signals detected.

DETAILED DESCRIPTION OF THE INVENTION

Figure 1:
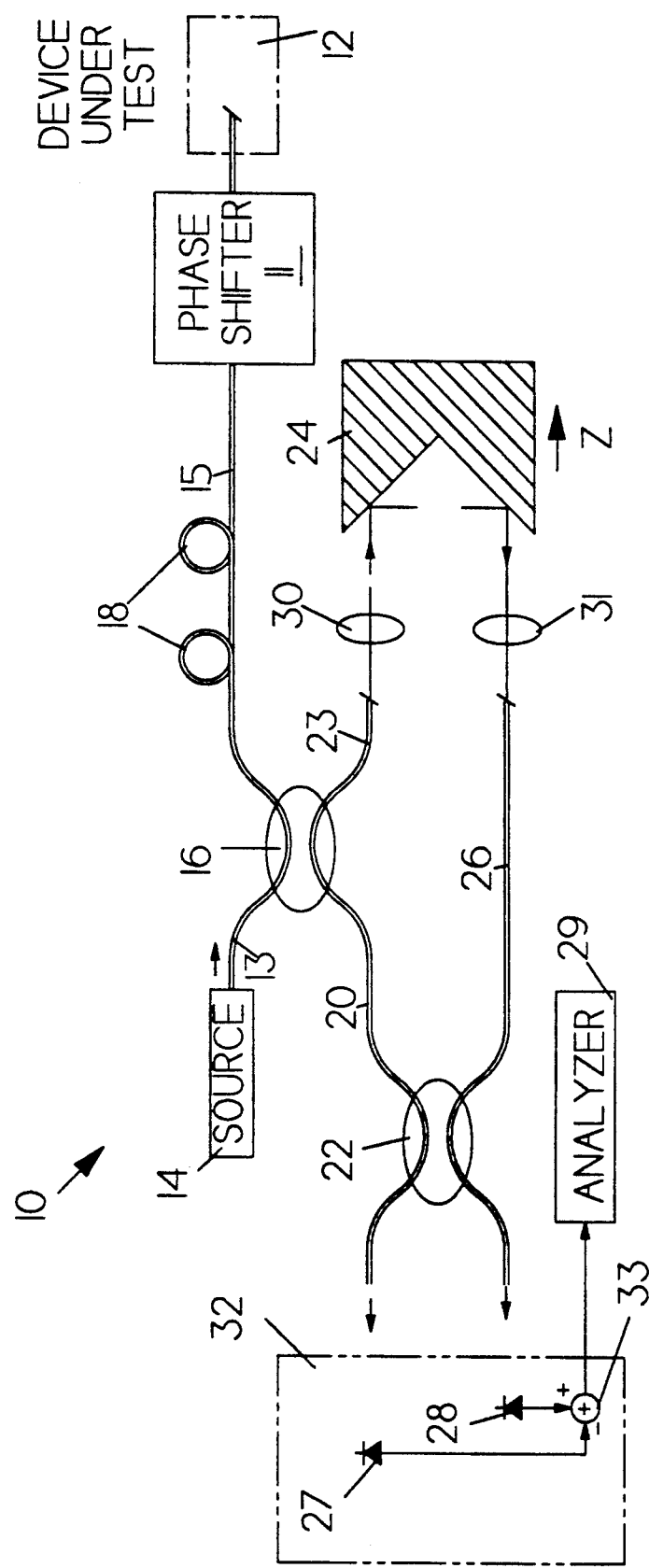
FIG. 1 is a block diagram of an optical low-coherence reflectometer.

The manner in which an optical low-coherence reflectometer utilizing a balanced detector operates may be more easily understood with reference to FIG. 1 which is a schematic diagram of an optical low-coherence reflectometer 10 for measuring the optical properties of a device 12. A low-coherence light source 14 is used to illuminate device 12. Optical coherence length of the light from light source 14 determines the spatial resolution of the measurements. A suitable light source may be constructed by utilizing the amplified spontaneous emission from an erbium-doped fiber. Such fibers are known to the optical arts, and hence, will not be discussed in more detail here. Light from source 14 is split by coupler 16 which is connected to source 14 by fiber 13. Coupler 16 divides the light between two arms of the interferometer. The first arm comprising fiber 15 delivers light to device 12. The polarization of the light is controlled by two polarization control loops 18. An optional phase shifter 11 may be included in this arm of the interferometer. Backscattered light from device 12 is returned to coupler 16 via fiber 15. A portion of the backscattered light is delivered to a second coupler 22 via fiber 20.

The second arm of the interferometer has a variable time delay. The portion of the light from coupler 16 that is not routed down fiber 15 is routed to fiber 23 and provides a reference light signal. This light is collimated by lens 30 onto a retroreflecting mirror 24 which is mounted on a moving stage. The motion in the Z direction alters the optical path length of the second arm of the interferometer. Light leaving mirror 24 is imaged into fiber 26 by lens 31 and delivered to coupler 22. Coupler 22 acts as an adder for combining the backscattered light from device 12 and the reference signal light from source 14. When the time delay in the second arm of the interferometer matches the time delay of a reflection from device 12, coherent interference occurs producing a beat signal at a predetermined frequency. The power in the light signal at the beat frequency is detected by a balanced detector 32 comprising two photodiodes 27 and 28 and an adder 33. The balanced detector removes any intensity noise on the incoming optical signals. The subtracted output is then processed electronically to detect the strength of the interference signal. For example, the power spectrum of the substracted output may be measured by a spectrum analyzer 29.

The beat frequency is preferably chosen to coincide with a minimum in the receiver noise floor. This frequency may be controlled by either of two methods. The preferred method uses phase shifter 11 which is sawtooth ramped over a range of 180 degrees producing a serrodyne frequency shift on the returning signal. In this case, the beat signal will be at the serrodyne frequency with a strength dependent on the magnitude of the reflection. In this type of system, mirror 24 is stepped through each position and the signal averaged for a sufficient time to provide the desired signal to noise. Alternatively, phase shifter 11 can be eliminated and mirror 24 moved in a continuous manner during the measurement. The continuous motion results in a Doppler shift in the frequency of the light in the second arm of the interferometer. The beat frequency will be at the Doppler shift frequency. Unfortunately, jitter in the mechanical stage limits the extent to which a narrow band Doppler frequency shift can be generated; hence, the first technique is preferred to maximize the reflection sensitivity.

Couplers 16 and 22 are conventional fused couplers constructed by fusing two optical fibers together. Such couplers are conventional in the art, and hence, will not be discussed in more detail here.

As noted above, the range of locations in device 12 that can be scanned using interferometer 10 is determined by the maximum range of motion of mirror 24, which is typically less than 0.5 meters. Denote the maximum range of motion of mirror 24 by $Z_{max}$. Consider two inhomogeneities in device 12 that are separated by a distance D. If $D > Z_{max}$ then both of the inhomogeneities cannot be observed in a single scan. Hence, $Z_{max}$ determines the extent of the region in device 12 that can be scanned.

In principle, one can overcome this problem by scanning a distance equal to $Z_{max}$ in device 12, increasing the length of the reference arm by $Z_{max}$, scanning a second range from $Z_{max}$ to $2Z_{max}$, and so on. The length of the reference arm may be extended by inserting an optical fiber of length $Z_{max}$ into optical fiber 26 or optical fiber 23. While this procedure allows one to overcome the limitations of the interferometer for ranges of measurement that are a few times larger than $Z_{max}$, it is impractical if the range of measurement is many times $Z_{max}$.

The present invention overcomes this limitation by utilizing a resonant delay circuit in one arm of the interferometer. A resonant delay circuit is defined to be a device which accepts an input light signal and generates therefrom a sequence of delayed light signals. Each generated light signal is displaced in time with respect to the previously generated light signal in the sequence. The generated light signals have the same coherence properties as the input light signal.

Figure 2:
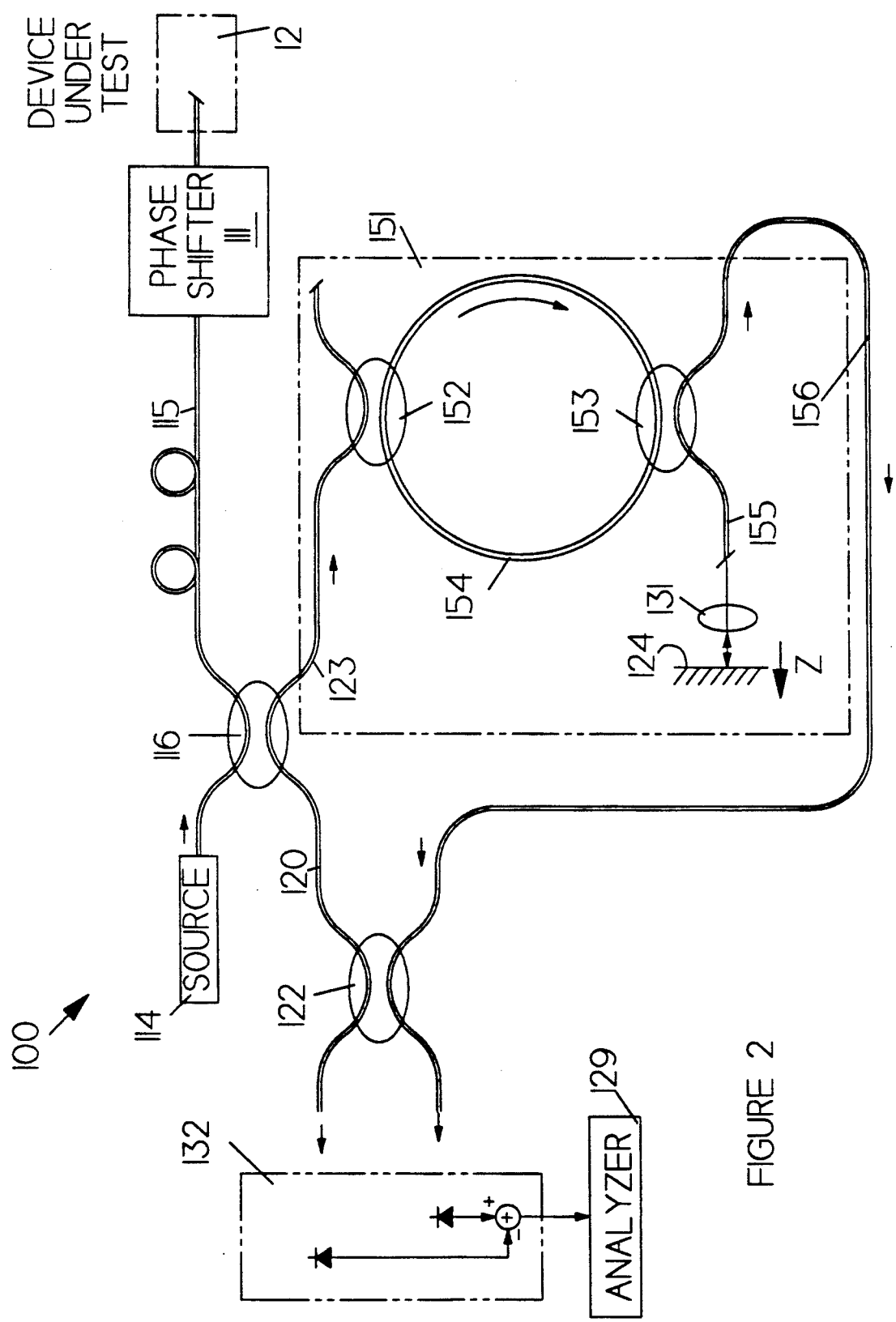
FIG. 2 is a block diagram of one embodiment of an optical low-coherence reflectometer according to the present invention.

A schematic diagram of one embodiment of an interferometer according to the present invention is shown in FIG. 2 at 100. In this embodiment, the resonant delay circuit utilizes a ring resonator. Light from source 114 is split by coupler 116 into two parts in a manner analogous to that described above with respect to interferometer 10. The first part of the light is applied to device 12. A portion of the light reflected by device 12 is applied to coupler 122 via coupler 116 and 120. The second part of the light from source 114 is applied to a resonant optical delay circuit 151. Optical delay circuit 151 is constructed from two couplers 152 and 153 and a loop of optical fiber 154 which is preferably constructed from a material having the same dispersion characteristics as the light signal encounters in traversing fiber 115, phase shifter 11 and device 12.

Optical delay circuit 151 operates as follows. A portion of the light from coupler 123 is introduced into fiber loop 154 by coupler 152 where it makes many traversals of fiber loop 154. The remaining portion of light is absorbed by a non-reflecting beam stop at the end of fiber 123. Each time the light signal traverses optical fiber 154 a portion of the light exits fiber loop 154 via coupler 153 and fiber 155. This light is imaged on a moving mirror 124 via lens 131. The light returning from the moving mirror is applied to coupler 122 via fiber 156 where it forms the reference signal for the interference.

Each time the light signal in fiber 154 traverses the fiber, it is attenuated because of losses at couplers 152 and 153. Hence, couplers 152 and 153 and fiber 154 effectively generate a plurality of copies of the reference light signal at ever decreasing intensities. Each successive copy is delayed relative to the previous copy by an amount equal to the delay time of fiber loop 154. Hence, for each position of mirror 124, device 12 is sampled at points separated by optical path length of fiber 154.

Figure 3:
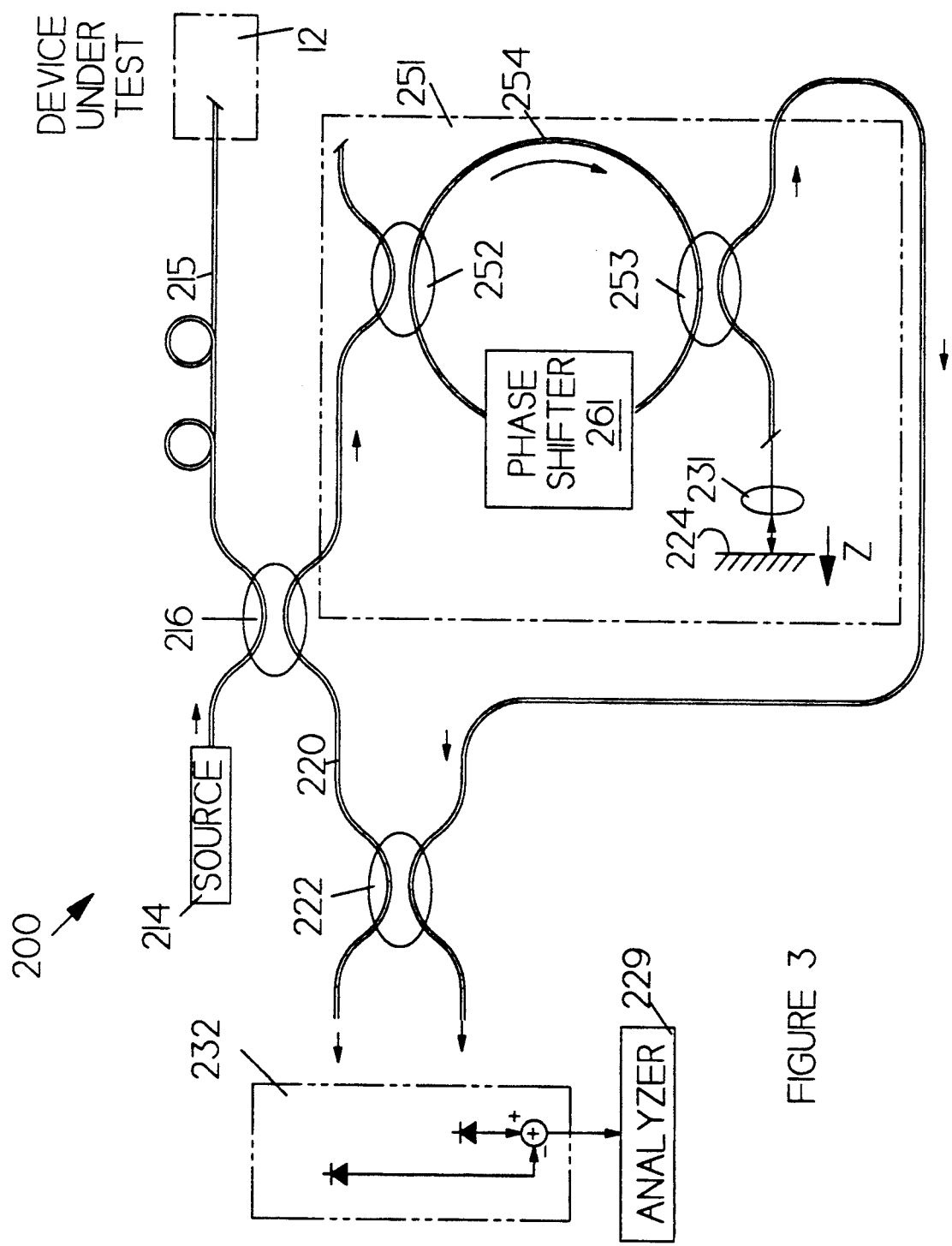
FIG. 3 is a block diagram of a second embodiment of an optical low-coherence reflectometer according to the present invention.

In practice, there will be numerous reflections from device 12 corresponding to the various inhomogeneities therein. To determine the exact location of each inhomogeneity, analyzer 129 must be able to identify which "copy" of the reference signal is being compared at any given time. This can be accomplished by including a phase shifter in the recirculating delay loop as shown in FIG. 3 at 261. The remaining elements of interferometer 200 serve analogous functions to the corresponding elements shown in FIG. 2. Phase shifter 261 is similar to phase shifter 111 shown in FIG. 2 in that it produces a serrodyne frequency shift on the signal. Each time the circulating light signal passes through phase shifter 261, the frequency is shifted slightly. Hence, the frequency of the beat signal detected by analyzer 229 identifies the number of times the reference signal traversed loop 254. This frequency together with the position of mirror 224 identifies the absolute location of the homogeneity being measured in device 12.

There are four possible locations for the resonant delay line. The above-described embodiments placed the resonant delay line in the reference arm. This is the preferred location for reasons of sensitivity. It can be shown that there is significantly more signal strength in the reference arm of the interferometer than is needed for obtaining optimal signal to noise ratio. Hence, the loss of intensity causes the least problems in this location. However, it will be apparent to those skilled in the art from the foregoing discussion that the resonant delay line may be located in the source arm (i.e., between source 214 and coupler 216), the device under test arm (i.e., fiber 215), or the receiver arm (i.e., fiber 220).

Furthermore, it will be apparent that other forms of optical delay may be used. For example, a Fabry-Perot cavity may be used to generate the resonant delay line. A schematic drawing of an embodiment of the present invention utilizing a Fabry-Perot cavity is shown at 300 in FIG. 4. The Fabry-Perot cavity is constructed from two partially reflecting mirrors 363 and 364 which are coincident with the ends of a region of optical material 367 which preferably has the same dispersion characteristics as device 12. Light from coupler 316 is imaged on mirror 363 which admits a fraction of the light which bounces between mirrors 363 and 364. Each time the light pulse strikes one of the mirrors, a portion of the light escapes. The light escaping into fiber 366 forms the reference beam for the interferometer. Optical isolator 366 prevents light leaving mirror 363 from reaching coupler 322 via fiber 320. Optical isolator 365 prevents light that is reflected from mirror 324 and returns via coupler 331 and fiber 366 from re-entering the cavity via mirror 364. The reflectivities of mirrors 363 and 364 are set so as to maximize the number of useful copies of the light pulse reaching coupler 322.

It should be noted that a phase shifter may also be included in interferometer 300 within the region between mirrors 363 and 364. The phase shifter has been omitted to simplify the drawing. The phase shifter would serve the same function as phase shifter 261 shown in FIG. 3. The phase shifter provides a means for analyzer 329 to determine the number of times a reference light signal bounces between mirrors 363 and 364 before exiting the cavity.

The embodiments of the present invention described above utilize a resonant delay with an effectively infinite impulse response. That is, once a light signal enters the delay line, copies are produced for an infinite time with exponentially decreasing intensities. As a result of the differences in intensity of the reference light signals, the signal to noise ratio corresponding to different regions in the device being scanned may be different.

Figure 5:
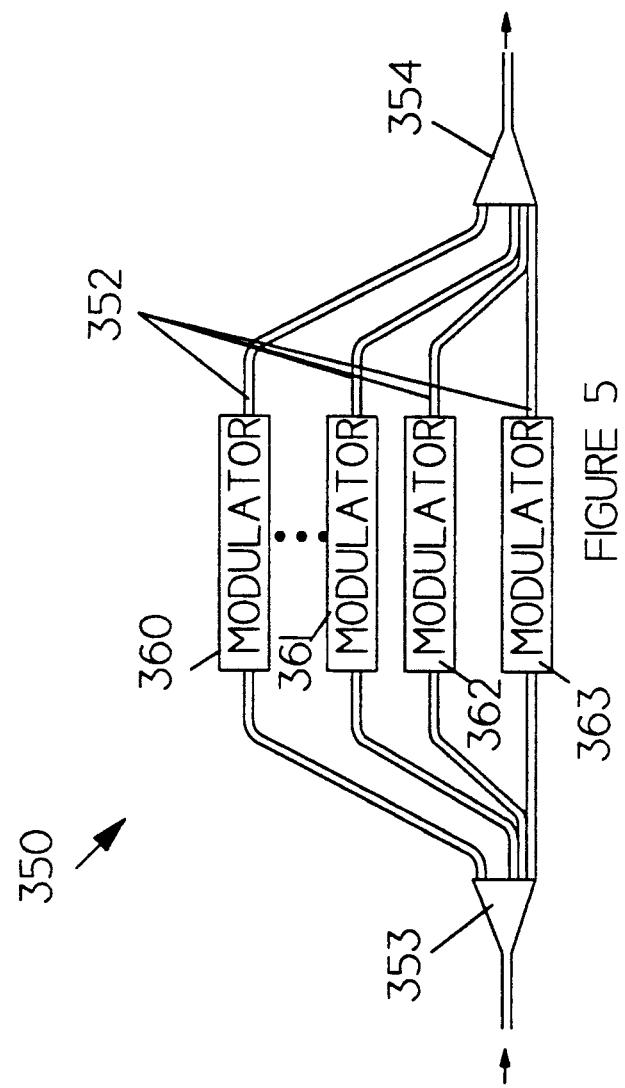
FIG. 5 illustrates an alternative type of resonant delay line.

An alternative delay method having a finite impulse response is shown in FIG. 5 at 350. Delay circuit 350 is constructed from a plurality of optical fibers 352 of different lengths. The ends of the fibers are fused together. A light signal entering the input end 353 is preferably split equally between the various fibers. The various copies of the input light signal are then collected at the output end 354. Since delay circuit 350 generates a fixed number of equal amplitude copies of the input light signal, each of the corresponding ranges of distances in the device being scanned is treated the same. To allow the identification of the specific delay introduced into each signal, a phase (or frequency) modulator is included in each fiber as shown at 360-363. Each modulator alters the phase (or frequency) of the light by an amount that is unique to the delay experienced by the light in passing through fiber.

Figure 4:
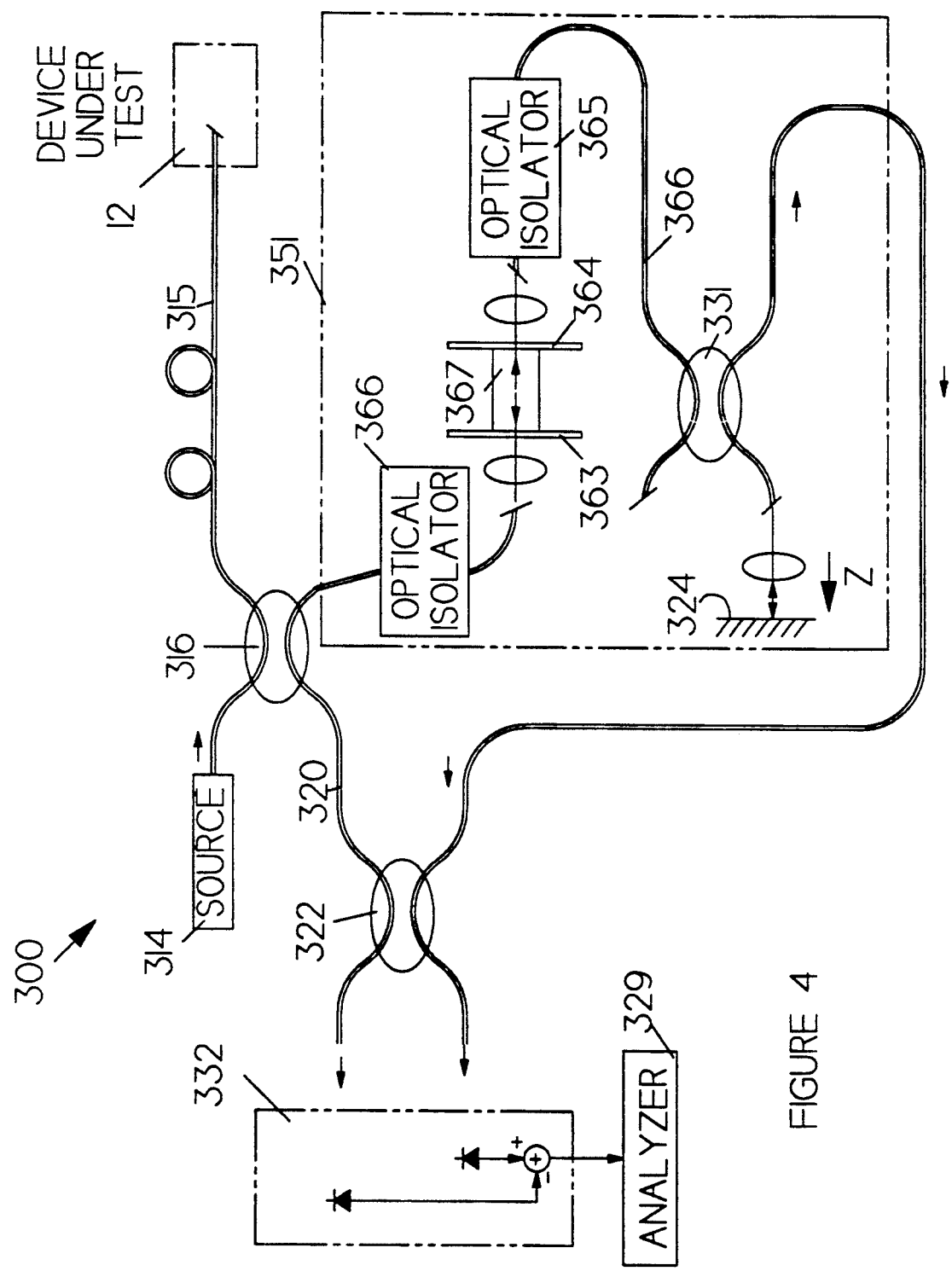
FIG. 4 is a block diagram of a third embodiment of an optical low-coherence reflectometer according to the present invention.
Figure 6:
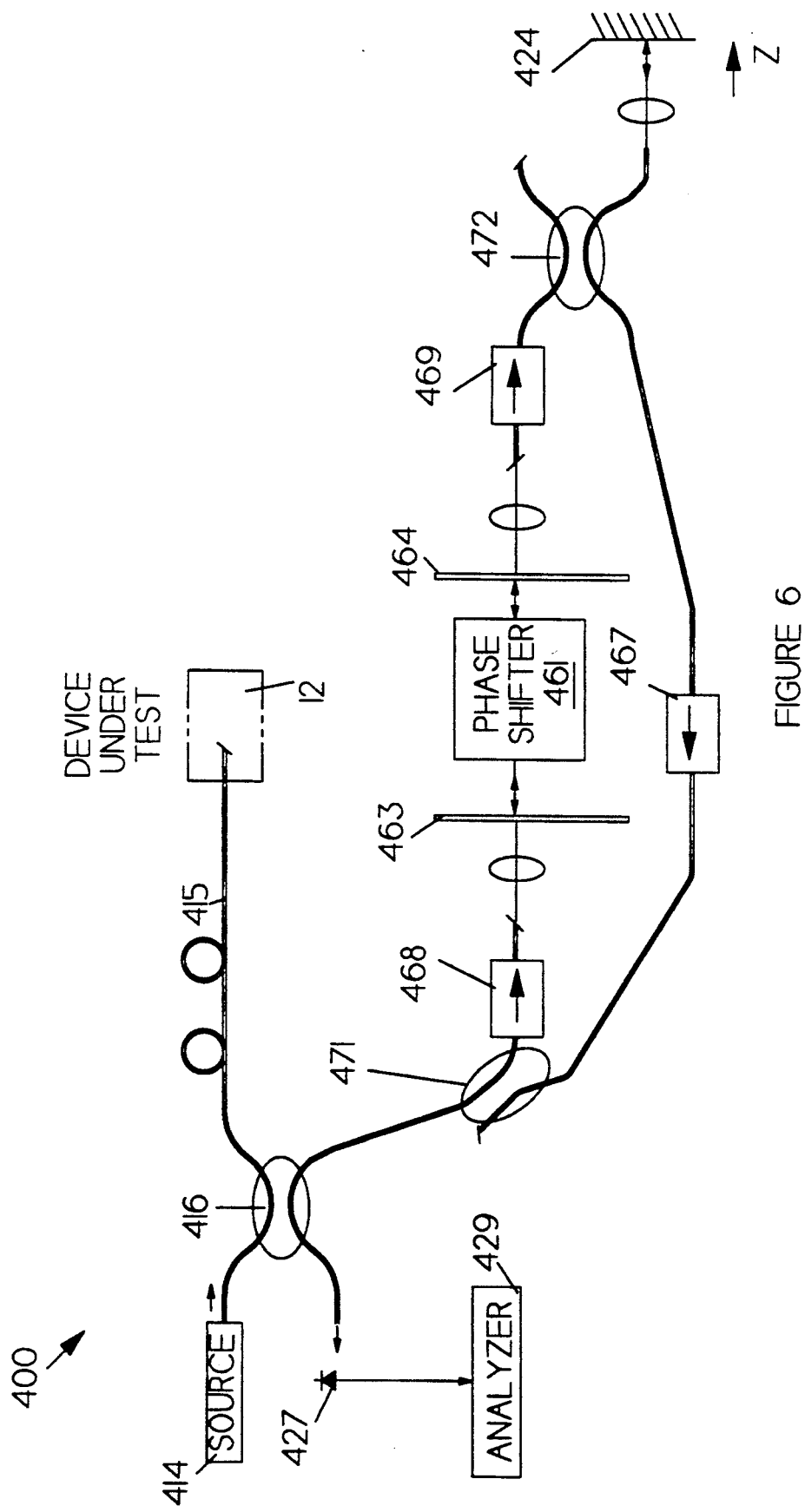
FIG. 6 is a block diagram of a fourth embodiment of an optical low-coherence reflectometer according to the present invention.

The embodiments of the present invention shown in FIGS. 2-4 have utilized a resonant delay which operates in the transmission mode with a balanced detector for minimizing noise. However, it will be apparent to those skilled in the art that the technique taught in the present invention may also be applied to a Micheleson interferometer. An embodiment of the present invention which is analogous to a Micheleson interferometer is shown in FIG. 6 at 400. Interferometer 400 utilizes a Fabry-Perot cavity to generate the resonant delay in the reference arm of the interferometer. Light from source 414 is split by coupler 416 into two parts. The first part is applied to the device 12 under test and the light reflected therefrom returned to coupler 416 via fiber 415. The second part is applied to the resonant delay generator comprising mirrors 463 and 464 which subtend a region having dispersion characteristics similar to those of device 12. The light leaving mirror 464 is coupled to a light path including moveable mirror 424. This light is returned to coupler 416 where if provides the reference signal for the interference. A phase shifter 461 is included between mirrors 463 and 464. Phase shifter 461 alters the frequency of the light bouncing between mirrors 463 and 464. Each time the light traverses phase shifter 461 its frequency is increased slightly. Light isolators 467-469 together with couplers 471 and 472 provide a means for preventing light reflecting off of mirror 463 from returning to detector 427. This light signal has sufficient intensity to generate excessive noise in detector 427.

The embodiments of the present invention discussed above utilize a continuous light source and identifies the copy of the reference signal being used by frequency shifting the various copies. Other methods for identifying the copy of the reference signal that is being combined with the reflected light from device 12 may, however, be used. Referring again to FIG. 2, if light source 114 is pulsed and analyzer 129 is gated in time, then the time delay between the pulse and the time at which analyzer 129 is gated may be used to select the specific copy of the reference signal used in the interference.

The gating operation may be accomplished by including an optical switch in fiber path 156 shown in FIG. 2. The switch would normally be open. At a predetermined time relative to the light pulse generated by source 114, the switch would be closed. The speed of the switch would need to be sufficient to assure that no more than one of the copies of the reference signal reached coupler 122. It will be apparent to those skilled in the art that the gating could also be accomplished by other switch configurations.

There has been described herein an optical low-coherence interferometer which provides an increased range of measurement. Various modifications to the present invention will become apparent to those skilled in the art from the foregoing description and accompanying drawings. Accordingly, the present invention is to be limited solely by the scope of the following claims.

What is claimed is:

1. An optical interferometer for measuring the optical properties of a device, said interferometer comprising:
   source means for providing a low-coherence light signal;
   splitting means for dividing said low-coherence light signal into first and second light signals;
   means for applying a portion of said first light signal to said device;
   adding means for combining light signals on first and second ports thereof to generate a combined light signal;
   detection means for measuring the amplitude of said combined light signal;
   means for collecting a portion of the backscattered light generated by the application of said first light signal to said device and for inputting a portion of said collected backscattered light to said first port of said adding means;
   delay means for generating a sequence of light signals from one of said first or second light signals, each said generated light signal being displaced in time with respect to the previously generated light signal in said sequence; and
   means for inputting a portion of said generated light signals to said second port of said adding means.

2. The interferometer of claim 1 wherein said delay means further comprises means for varying the difference in the optical path lengths traveled by said backscattered light and said generated light signals before entering said adding means.

3. The interferometer of claim 1 wherein said detection means further comprises means for identifying a specific said delayed light signal in said sequence of delayed light signals.

4. The interferometer of claim 3 wherein said identifying means comprises means for altering the frequency or phase of each said generated light signal generated by said delay means relative to the previous said generated light signal in said sequence.

5. The interferometer of claim 3 wherein the portion of said first light signal applied to said device comprises a light pulse and wherein said identifying means comprises means for specifying the time delay between the generation of said light pulse and the time at which said detection means measures said amplitude of said combined light signal.

6. The interferometer of claim 1 wherein said delay means comprises a Fabry-Perot cavity.

7. The interferometer of claim 1 wherein said delay means comprises a ring resonator.

8. The intererometer of claim 1 wherein said delay means comprises a plurality of optical fibers of different lengths.

* * * * *